United States Patent [19]
Aksyuk et al.

[11] Patent Number: 5,974,207
[45] Date of Patent: Oct. 26, 1999

[54] ARTICLE COMPRISING A WAVELENGTH-SELECTIVE ADD-DROP MULTIPLEXER

[75] Inventors: Vladimir A. Aksyuk, Piscataway; David J. Bishop, Summit; Joseph E. Ford, Oakhurst; Richart E. Slusher, Lebanon, all of N.J.

[73] Assignee: Lucent Technologies, Inc., Murray Hill, N.J.

[21] Appl. No.: 08/997,173

[22] Filed: Dec. 23, 1997

[51] Int. Cl.$^6$ .................................................. G02B 6/293
[52] U.S. Cl. ............................................... 385/24; 385/16
[58] Field of Search ................................. 385/16–18, 24

[56] References Cited

U.S. PATENT DOCUMENTS

| | | | |
|---|---|---|---|
| 5,742,712 | 4/1998 | Pan et al. ................................. | 385/18 |
| 5,748,349 | 5/1998 | Mizrahi ................................... | 359/130 |
| 5,751,456 | 5/1998 | Koonen .................................. | 359/127 |
| 5,774,606 | 6/1998 | De Barros et al. ..................... | 385/24 |
| 5,778,118 | 7/1998 | Sridhar .................................. | 385/24 |
| 5,812,709 | 9/1998 | Arai et al. .............................. | 385/16 |
| 5,822,095 | 10/1998 | Taga et al. ............................. | 359/127 |

FOREIGN PATENT DOCUMENTS

| | | |
|---|---|---|
| 0 510 629 A1 | 10/1992 | European Pat. Off. . |
| 0 651 529 A1 | 5/1995 | European Pat. Off. . |
| 0 699 927 A1 | 3/1996 | European Pat. Off. . |

OTHER PUBLICATIONS

Chawki et al., "Evaluation of an Optical Boosted Add/Drop Multiplexer OBADM including Circulators and Fiber Grating Filters," Proc. 21$^{st}$ Eur. Conf. Opt. Comm., vol. 1, Sep. 17, 1995, pp. 47–50, XP 002032556.

*Primary Examiner*—John D. Lee
*Assistant Examiner*—Juliana K. Kang

[57] ABSTRACT

A wavelength-selective add-drop multiplexer is disclosed for adding and/or dropping spectral components from a wavelength-division-multiplexed optical signal. (1×1) or (2×2) optical switches are used, either alone or in conjunction with other optical elements, to separate spectral components identified for drop from other spectral components.

16 Claims, 7 Drawing Sheets

ARTICLE COMPRISING A WAVELENGTH-SELECTIVE ADD-DROP MULTIPLEXER

STATEMENT OF RELATED CASES

The present invention is related to patent application Ser. Nos. 08/856569 filed May 15, 1997 and 08/912883 filed Aug. 16, 1997, both of which are incorporated by reference herein.

FIELD OF THE INVENTION

The present invention relates generally to optical communications networks. More particularly, the present invention relates to an article for adding spectral components to, and dropping spectral components from, a multiplexed optical signal.

BACKGROUND OF THE INVENTION

Wavelength-division-multiplexed (WDM) optical communications networks support multiplexed optical signals having many different spectral components or wavelengths. Each one of such wavelengths, referred to as a channel, represents an independent data stream. Before processing a WDM signal at any node within a network, it may be necessary to remove ("drop"), or, alternatively, to add, one or more spectral components to the WDM signal.

While WDM communications networks have been studied, theoretically, for years, there are few, if any, commercial implementations of such networks. Thus, while the need for a device capable of adding and/or dropping spectral components from a WDM signal has been recognized in the art, few if any of such devices have been described in the literature. It is clear, however, that regardless of its configuration, such a device should be transmission format independent, robust, fast and low cost.

SUMMARY OF THE INVENTION

A wavelength-selective add-drop multiplexer (WSADM) is disclosed for adding and/or dropping spectral components from a wavelength-division-multiplexed optical signal. A (1×1) or (2×2) optical switch is used, either alone or in conjunction with other optical elements, to separate spectral components identified for drop from other spectral components, in accordance with the illustrative embodiments of the present invention.

Each (1×1) switch comprises a micro-electromechanical actuator that positions a reflective device into, or out of, a path of a spectral component passing through the switch. If the reflective device is in the optical path, the spectral component is reflected therefrom, and does not cross the switch. If the reflective device is out of the optical path, the spectral component crosses the switch. Each (2×2) switch includes an optical director, which, in a first embodiment, is a variable-reflectivity device, such as an optical modulator, and in a second embodiment, is a constant reflectivity device that is actuated by a micro-electromechanical actuator.

A WSADM in accordance with the illustrative embodiments of the present invention can be configured in a variety of ways as a function of switch selection, among other elements. In a first group of embodiments, the WSADM comprises, in principal part, one or two demultiplexer/multiplexers, such as a waveguide grating router, and the switches. The demultiplexer is used for separating a WDM signal into its constituent spectral components. The switches are used to suitably direct such spectral components for drop, or not, as desired. The separated spectral components are then run "backwards" through the waveguide grating router for re-multiplexing. In some embodiments, (1×1) switches are used in the WSADM, and they must used in conjunction with optical circulators or the like. In other embodiments wherein (2×2) switches are used, such optical circulators are not required.

In a second group of embodiments, a WSADM is configured as a cascade of (2×2) switches. The switches include a wavelength filtering device, such as a plurality of dielectric layers, which selectively reflect or transmit various spectral components comprising the WDM signal. Thus, as a WDM signal passes through the series of switches, selected spectral components can be separated for drop without demultiplexing the signal.

BRIEF DESCRIPTION OF THE DRAWINGS

Further features of the invention will become more apparent from the following detailed description of specific embodiments thereof when read in conjunction with the accompanying Figures in which.

DETAILED DESCRIPTION OF THE INVENTION

Figure 1:
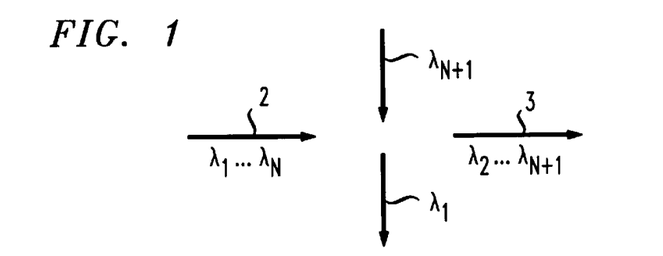
FIG. 1 illustrates the concept of wavelength selective add-drop.

The illustrated embodiments of the present invention show a wavelength-selectable add-drop multiplexer (WSADM) for use in lightwave systems. The functionality of a WSADM is illustrated in FIG. 1. A WSADM receives WDM signal 2 having a multiplicity, N, of spectral components or wavelengths $\lambda_1$–$\lambda_N$. The N spectral components, each of which is an independent data stream, define N "channels" of WDM signal 2. The WSADM is operable to remove or "drop" at least a first selected spectral component $\lambda_1$ from the multiplicity of such spectral components. WSADM 1 is further operable to add at least a second selected spectral component $\lambda_{N+1}$ to the multiplicity of such spectral components.

If a first spectral component, such as $\lambda_1$, is dropped, then a second spectral component, such as $\lambda_{N+1}$, is typically added to replace the dropped component. The second selected spectral component is added to the channel from which the first selected spectral component is dropped. In other words, the added and dropped components have similar wavelengths, i.e., the wavelengths of both spectral components fall within the band or range of wavelengths defined for a given channel. Of course, the first dropped and second added spectral components will typically carry different information.

If a spectral component, such as $\lambda_{N+1}$, is added to a multiplexed signal 2, then the spectral component $\lambda_1$ occupying the channel to which $\lambda_{N+1}$ is added must be dropped to avoid interference between the two signals. In other words, a first spectral component may be dropped without adding a second spectral component to replace it, but a second spectral component may not be added without dropping a first spectral component otherwise occupying the same channel.

Multiplexed signal 3 results from the add and drop operations discussed above, wherein, in the illustrative embodiment shown in FIG. 1, the second selected spectral component $\lambda_{N+1}$ has replaced the first selected spectral component $\lambda_1$. It should be understood that one or more spectral components can be added or dropped by a WSADM according to the present invention.

In accordance with the present invention, optical switches are used, at times in conjunction with other elements, to separate the one or more spectral components selected for "drop" from other spectral components, or to introduce the one or more spectral components selected for "add." Switches suitable for use in conjunction with the present invention have low insertion loss (preferably less than 1 dB), high contrast ratio (preferably greater than 20/1), wide optical bandwidth (preferably at least about 30 nm around a center wavelength), moderate speed (at least about 1 mbit/sec), low cost and substantially no temperature or polarization dependence. Using such optical switches advantageously provides a low cost, robust, sufficiently fast and transmission format independent wavelength-selectable add-drop multiplexer.

First switch S1 suitable for use in conjunction with the present invention is a (1×1) micro-machined optical switch, such as is described in U.S. patent application Ser. No. 08/856569 filed May 15, 1997. Illustrative embodiments of such a (1×1) switch use a micro-electromechanical systems (MEMS)-based actuator to move an optical device into, and out of, the path of an optical signal. If the optical device is in the path of the optical signal, it affects the signal in some manner. For use in conjunction with some embodiments of the present invention, the optical device is a reflective device having a fixed reflectivity, such as a dielectric mirror or the like. Thus, if the reflective device is in the optical path, the switch is in a substantially reflective state, and, if the reflective device is out of the optical path, the switch is in a substantially transmissive state. A simplified illustration of one embodiment of such a switch and its operation is shown in FIG. 2a.

Figure 2A:
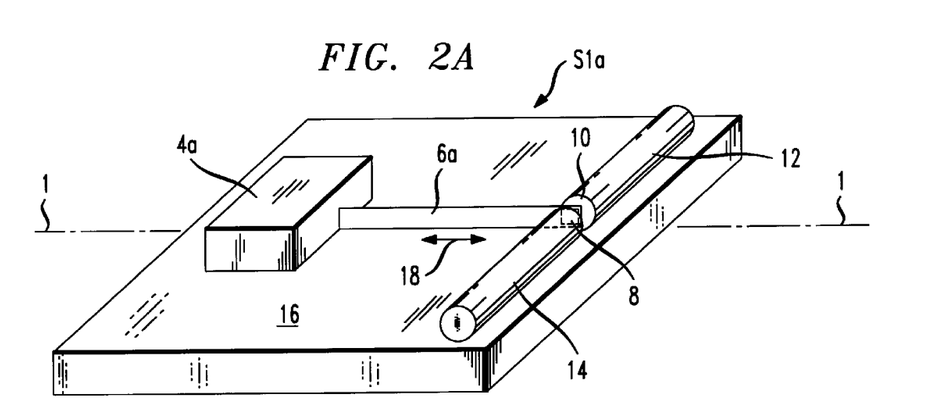
FIG. 2a shows a first embodiment of a micro-mechanically actuated (1×1) switch for use in conjunction with the present invention.

In the embodiment shown in FIG. 2a, switch S1a is configured for "in-plane" switching. As used herein, the terms "in-plane", horizontal, "out-of-plane" and vertical reference a direction or location relative to the surface of a support upon which the optical switch resides. For example, in-plane or horizontal movement refers to movement along a plane parallel to the surface of the support.

Optical switch S1a includes hinged-plate actuator 4a, described in more detail later in this specification, reflective device 8, and linkage 6a. Optical switch S1a and two waveguides 12, 14 are disposed on support 16. Linkage 6a mechanically links or interconnects hinged-plate actuator 4a to reflective device 8. Linkage 6a is situated along axis 1—1 passing through gap 10 between waveguides 12 and 14. The two spaced waveguides 12, 14 are aligned to optically communicate. The waveguides may be optical fibers or other suitable optical transmission media.

Linkage 6a and reflective device 8 are positioned relative to optical fibers 12, 14 so that the optical device is movable between a first position that is in the path of an optical signal traveling between the fibers placing the switch in a reflective state, and a second position that is out of the optical path placing the switch in a substantially transmissive state. Since, as described above, the actuator 4a imparts an in-plane motion to linkage 6a, optical device 8 moves horizontally back-and-forth, i.e., in a reciprocating-like motion, indicated by direction vector 18, moving into and out of the optical path. It should be appreciated that optical switch S1a can be configured so that reflective device 8 is at the first position (in the optical path) when actuator 4a is actuated, and at the second position (out of the optical path) when not actuated, or vice-versa.

In one embodiment, actuator 4a comprises two vertically-oriented electrodes. One of the electrodes is movable, the other of the electrodes is fixed. As a voltage is applied across the electrodes by a controlled voltage source, the movable electrode swings towards the fixed electrode. The substantially horizontal displacement of the movable electrode is transferred, by linkage 6a, to reflective device 8. As a result, reflective device 8 moves horizontally or "in-plane" along a path that places it in, or out of, the optical path as a function of the back and forth oscillatory-type motion of the movable electrode.

Figure 2B:
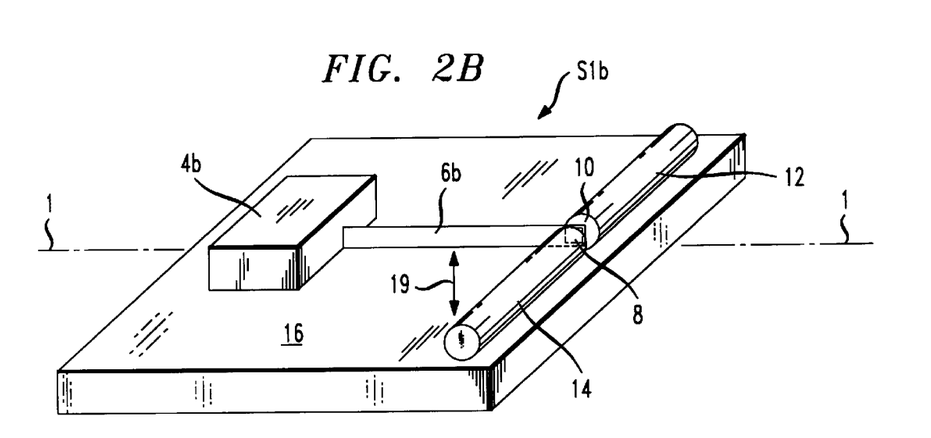
FIG. 2b shows a second embodiment of a micro-mechanically actuated (1×1) switch for use in conjunction with the present invention.

In a second embodiment of a (1×1) switch shown in FIG. 2b, switch S1b is configured for "out-of-plane" switching. Switch S1b includes actuator 4b configured to impart out-of-plane motion, indicated by direction vector 19, via linkage 6b to reflective device 8. Optical switch S1b and waveguides 12, 14 are disposed on support 16. Linkage 6b is situated along axis 1—1 passing through gap 10 between waveguides 12, 14.

Linkage 6b and reflective device 8 are positioned relative to waveguides 12, 14 so that the optical device is movable between a first position that is in the path of an optical signal traveling between the waveguides placing the switch in a substantially reflective state, and a second position that is out of the optical path placing the switch in a substantially transmissive state. Since, as mentioned above, actuator 4b imparts a vertical or out-of-plane motion to linkage 6b, reflective device 8 therefore moves in a substantially "up-and-down" or vertically reciprocating motion into and out of the optical path. It should be appreciated that optical switch S1b can be configured so that the reflective device 8 is at the first position (in the optical path) when actuator 4b is actuated, and at the second position (out of the optical path) when not actuated, or vice-versa.

In one embodiment, actuator 4b includes at least one horizontally-disposed, vertically-movable electrode that is suspended over a conductive region of support 16. As a voltage is applied from a controlled voltage source across the electrode and conductive region, the vertically-movable electrode moves downwardly toward the conductive region. Linkage 6b, which, in one embodiment, is a beam and pivot member configured in a teeter or seesaw fashion, transfers the vertical or out-of-plane oscillatory-type motion of the electrode to reflective device 8 positioned between the two waveguides. The reflecting means moves vertically into and out of an optical path of an optical signal traveling through the waveguides.

In some embodiments, the electrodes, linkages and other elements of optical switches S1a and S1b described above are implemented as hinged plates. Such hinged plates are well known to those skilled in micro mechanics. Further detail concerning hinged plates and a (1×1) micro-machined optical switch is provided in U.S. patent application Ser. Nos. 08/856565 and Ser. No. 08/856569, both of which are incorporated by reference herein. For additional background information concerning hinged plates, see Pister et al., "Microfabricated Hinges," v.33, Sensors and Actuators A, pp. 249–256, 1992.

A second switch suitable for use in conjunction with the present invention is a (2×2) free space optical bypass-exchange switch, such as is described in U.S. patent application Ser. No. 08/912883 filed Aug. 16, 1997. Some embodiments of the (2×2) switch illustrated therein include telecentric imaging device 104 for delivering a signal from an input to an output with high efficiency, and further include optical director 106 capable of changing the path of an optical signal through the switch.

For use in conjunction with the present invention, optical director 106 is a variable-reflectivity device, such as an optical modulator, or a constant-reflectivity device, such as a dielectric mirror. If a variable reflectivity device is used, the switching function is obtained, i.e., the path of an optical signal traveling therethrough is changed, by a controlled change in reflectivity, such as between substantially transmissive and substantially reflective. If a constant-reflectivity mirror is used, the switching function is obtained by moving the mirror into and out of the path of an optical signal traveling through the switch, again placing the switch in respective substantially reflective or transmissive states. Such movement is actuated, in some embodiments, by a MEMS-based actuator, such as actuators 4a, 4b described above.

Figure 3A:
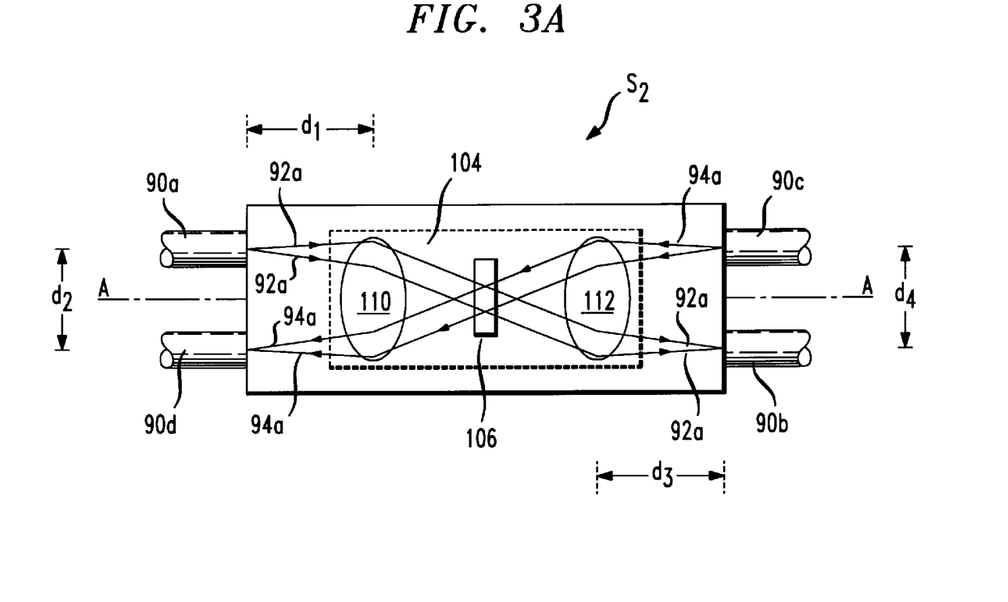
FIG. 3a shows a 2×2 switch for use in conjunction with the present invention, wherein the operation of the switch in a transmissive state is pictured.
Figure 3B:
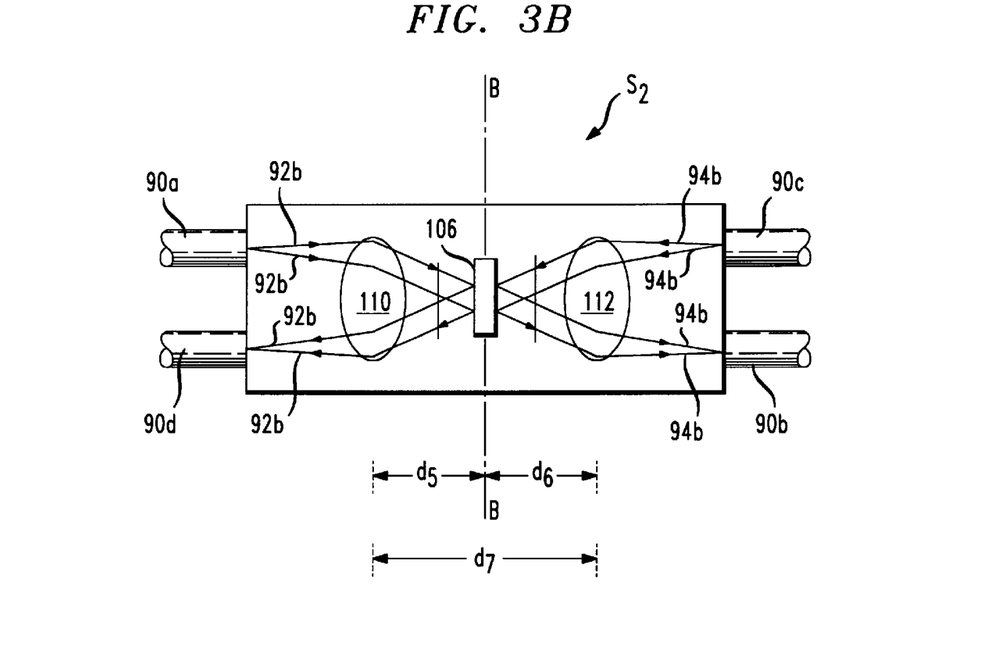
FIG. 3b shows a 2×2 switch for use in conjunction with the present invention, wherein the operation of the switch in a reflective state is pictured.

An exemplary embodiment of the (2×2) free space optical bypass-exchange switch is shown in FIGS. 3a and 3b. In the embodiment illustrated in those Figures, telecentric imaging device 104 is a pair of lenses 110, 112 appropriate for collimating light incident thereon. Suitable lenses include, without limitation, graded index (GRIN) lenses, ball lenses and molded lenses, such as, for example, injection molded lenses. The functioning and location of such lenses 110, 112 for providing the desired telecentric optical system is described below. Moreover, in the embodiment shown in FIGS. 3a and 3b, the optical director 106 is a variable-reflectivity device, and inputs 90a, 90c and outputs 90b and 90d are implemented as optical fibers.

For the purposes of the present discussion, it is assumed that the spacing $d_4$ between second input fiber 90c and first output fiber 90b equals the spacing $d_2$ between first input fiber 90a and second output fiber 90d. As such, no magnification or demagnification is required, and lenses 110 and 112 can be identical. It should be understood that the condition $d_2=d_4$ is not a requirement of the present invention and that in other embodiments $d_2 \neq d_4$.

FIG. 3a illustrates a cross or "exchange" or "substantially transmissive" state wherein optical signal 92 (ray trace 92a) is imaged from first input fiber 90a into first output fiber 90b and optical signal 94 (ray trace 94a) is imaged from second input fiber 90c into second output fiber 90d. Such imaging is accomplished as follows. Collimating lens 110 is positioned at a distance $d_1$ from first input fiber 90a. If distance $d_1$ is equal to the focal length of collimating lens 110, the lens will collimate light incident thereon. Thus, with $d_1$ equal to the focal length of lens 110, the lens will collimate optical signal 92. Collimating lens 112 is positioned at a distance $d_3$ from second input fiber 90c. If the distance $d_3$ is equal to the focal length of lens 112, the lens will collimate optical signal 94. Since, as previously noted, the distance $d_1=d_4$, then $d_1=d_3$.

Thus, optical signal 92 (ray trace 92a) is collimated by lens 110, remains collimated as received by lens 112, and is imaged into first output fiber 90b. The telecentric optical system is thus created by one pass through lens 110 and one pass through lens 112. To simplify the optics, it is preferable that the input fibers and output fibers 90a–90d are equidistant from an optical axis A—A of lenses 110 and 112. Optical signal 94 (ray trace 94a) is collimated by lens 112, remains collimated as received by lens 110, and is imaged into second output fiber 90d.

A bar or "bypass" or "substantially reflective" state of the bypass-exchange switch is illustrated in FIG. 3b, wherein optical signal 92 (ray trace 92b) is imaged from first input fiber 90a into the second output fiber 90d, and optical signal 94 (ray trace 94b) is imaged from second input fiber 90c into first output fiber 90b. Signal 92 is imaged into second output fiber 90d at high efficiency by situating optical director 106 at the Fourier plane B—B, i.e., the back focal plane of collimating lens 110, at a distance $d_5$ from lens 110. A collimated beam entering a lens is focused to a point on a surface located at the Fourier plane. See, Goodman, *Introduction to Physical Optics*, Chapter 5, "Fourier Transforming and Imaging Properties of Lenses," (McGraw-Hill, 1968) for a mathematical definition.

Optical director 106 is disposed distance $d_6$ from collimating lens 112, at the Fourier plane of lens 112, so that optical signal 94 is imaged into first output fiber 90b at high efficiency. Thus, collimating lenses 110 and 112 are spaced by distance $d_7$, wherein $d_7=d_5+d_6$. In embodiments wherein lenses 110 and 112 are identical, $d_5$ is equal to $d_6$, so that the Fourier plane B—B and optical director 106 are located equidistant from lenses 110 and 112. By placing optical director 106 in the Fourier plane, as described above, and making two passes through lens 92 or lens 94, a telecentric optical system is again created.

In some embodiments, lenses 110, 112 are quarter-pitch GRIN lenses. As will be appreciated by those skilled in the art, a quarter-pitch GRIN lens is the shortest length GRIN lens that will substantially collimate an optical signal, such as optical signals 92 and 94. It should be understood that a suitably actuated constant-reflectivity device can be substituted for the variable-reflectivity device used in the illustrative embodiment shown in FIGS. 3a and 3b. Further detail concerning the above-described (2×2) free space optical bypass-exchange switch is provided in U.S. patent application Ser. No. 08/912883.

Selecting a particular one of the above-described switches, i.e., a (1×1) vs. a (2×2), for incorporation into the present WSADM affects overall WSADM configuration. Switch selection, as well as other variations in the configuration of the present WSADM are addressed below by way of six illustrative embodiments shown in FIGS. 4–7 and 9–10 and described in the accompanying text.

Figure 4:
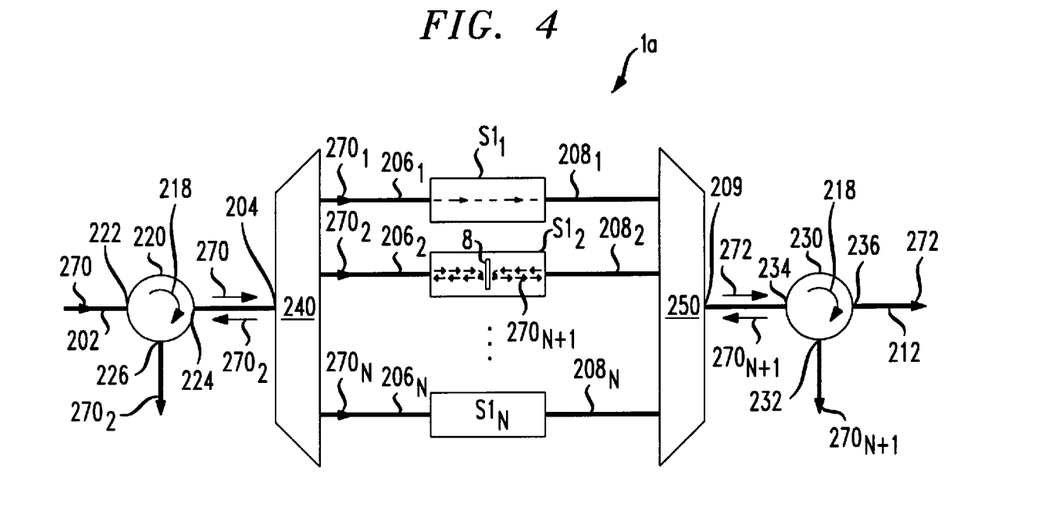
FIG. 4 shows a wavelength-selective add-drop multiplexer in accordance with an illustrative embodiments of the present invention comprising N (1×1) switches, two optical circulators and two (1×N) demultiplexers/multiplexers.

FIG. 4 shows a first embodiment of WSADM 1a suitable for processing WDM signal 270 having N channels.

WSADM 1a receives, as input, WDM signal 270 carried on waveguide 202. WDM signal 270 is received by port 222 of optical circulator 220. The operation of optical circulator 220, a device known in the art, is such that an optical signal, such as WDM signal 270, is delivered to the next port along circulation direction 218, which is port 224. From port 224, signal 270 is launched along waveguide 204 towards a device suitable for separating or demultiplexing WDM signal 270 into its constituent spectral components $270_1$–$270_N$. In WSADM 1a, and in the other illustrated embodiments described later in this specification, a waveguide grating router ("WGR"), also known as a Dragone router, is used for demultiplexing/multiplexing. In WSADM 1a, (1×N) WGR 240 demultiplexes WDM signal 270 into its N spectral components.

The N spectral components of WDM signal 270 appear on the outputs of WGR 240 and are carried by waveguides $206_1$–$206_N$ to (N) (1×1) switches $S1_1$–$S1_N$. The (1×1) switches $S1_1$–$S1_N$ are configured as previously described. The subsequent path of each spectral component $270_1$–$270_N$ is controlled by the respective associated (1×1) switch $S1_1$–$S1_N$. More particularly, the switches are placed in either of two states; a reflective state, in which substantially no light crosses the switch, and a transmissive state, in which substantially all light crosses the switch.

In the reflective state, a reflective device, such as a dielectric mirror, is positioned in the optical path of the spectral component traveling through a switch. For example, (1×1) switch $S1_2$ is shown in a substantially reflective state in FIG. 4. In switch $S1_2$, reflective device 8 causes substantially all optical energy of spectral component $270_2$ to be reflected back along waveguide $206_2$ to WGR 240. Spectral component $270_2$ passes through WGR 240 and emerges on waveguide 204, and is delivered to port 224 of optical circulator 220. Optical circulator 220 advances the spectral component to port 226 for "drop." In this manner, one or more spectral components can be dropped from a WDM signal.

In the transmissive state, the reflective device is positioned out of the optical path of the spectral component traveling therethrough. Thus, spectral components entering switches that are in a substantially transmissive state, such as switch $S1_1$, cross those switches undisturbed and are launched into waveguides, such as waveguide $208_1$, leading to a second (1×N) WGR 250. Spectral components entering the WGR 250 are recombined or remultiplexed. Remultiplexed signal 272 appears at the output of WGR 250 and is launched into waveguide 209 and delivered to port 234 of second optical circulator 230. Optical circulator 230 delivers WDM signal 272 to port 236 and into waveguide 212 for transmission to a network node or the like.

One or more spectral components can be added to the original group of spectral components $270_1$–$270_N$ comprising WDM signal 270 (less any dropped spectral components). Such addition is accomplished by delivering the spectral components to be added to port 232 of optical circulator 230. For clarity of description, the addition of only one spectral component $270_{N+1}$ is described below. It should be understood, however, that the N (1×1) switches can add N spectral components, assuming a like number of spectral components are dropped from the original signal. The one additional spectral component $270_{N+1}$ is advanced from port 232 to port 234 and launched into waveguide 209 towards the WGR 250. The WGR 250 delivers the spectral component onto the appropriate one of waveguides $208_1$–$208_N$ as a function of wavelength. Spectral component $270_{N+1}$ is assumed to have a wavelength appropriate for occupying the channel vacated by dropped spectral component $270_2$. As such, spectral component $270_{N+1}$ is launched into waveguide $208_2$ and encounters switch $S1_2$.

Recall that switch $S1_2$ is in a substantially reflective state to effect the above-described "drop" of spectral component $270_2$. As such, spectral component $270_{N+1}$ is likewise reflected upon entering the switch $S1_2$, but towards WGR 250, there to be multiplexed along with other spectral components $270_1$ and $270_3$–$270_N$ into WDM signal 272.

Figure 5:
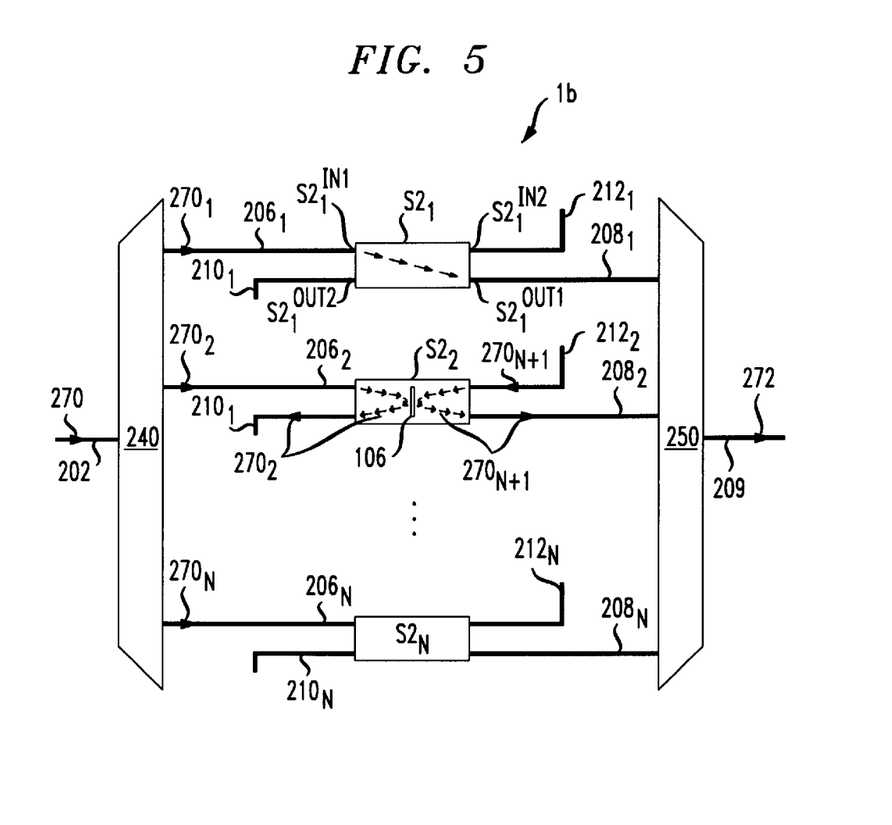
FIG. 5 shows a second illustrative embodiment of a wavelength-selective add-drop multiplexer comprising N (2×2) switches and two (1×N) demultiplexers/multiplexers.

FIG. 5 shows a second illustrative embodiment of a WSADM 1b. In WSADM 1b, a multiplicity of (N) (2×2) switches $S2_1$–$S2_N$, such as those described previously in this specification, replace the (1×1) switches of the previous embodiment. When using (2×2) switches $S2_1$–$S2_N$, optical circulators 220, 230 used in conjunction with the (1×1) switches of the first illustrative embodiment are no longer required, as is described below.

WSADM 1b receives, as input, WDM signal 270 carried on waveguide 202. WDM signal 270 is delivered to (1×N) WGR 240 wherein it is demultiplexed into its constituent spectral components $270_1$–$270_N$. The N spectral components of WDM signal 270 appear on the outputs of WGR 240 and are carried by waveguides $206_1$–$206_N$ to N (2×2) switches $S2_1$–$S2_N$. The (2×2) switches $S2_1$–$S2_N$ are configured as previously described, using, as the optical director 106, either a constant-reflectivity device and actuator, such as actuators 4a, 4b, or a variable-reflectivity device.

The switches may be placed, on an individual basis, in a transmissive state, wherein optical director 106 is substantially "invisible" to a spectral component traveling therethrough. In those embodiments wherein optical director 106 is a variable-reflectivity device, the switch is placed in a transmissive state by placing the variable-reflectivity device into a low reflectivity state. In other embodiments wherein optical director 106 is a constant-reflectivity device, the switch is placed in a transmissive state by removing the constant-reflectivity device from the optical path via operation of an associated actuator.

Alternatively, the switches may be placed, on an individual basis, in a reflective state, wherein optical director 106 reflects a substantial portion of a spectral component incident thereon. In those embodiments wherein optical director 106 is a variable-reflectivity device, the switch is placed in a reflective state by placing the variable-reflectivity device into a high reflectivity state. In other embodiments wherein optical director 106 is a constant-reflectivity device, the switch is placed in a reflective state by positioning the constant-reflectivity device in the optical path via operation of an associated actuator.

The disposition of each spectral component $270_1$–$270_N$, i.e., drop or remultiplexed into WDM signal 272, is controlled by respective associated (2×2) switch $S2_1$–$S2_N$. The (2×2) switches have two inputs and two outputs. First input $S2_i^{IN1}$ of each (2×2) switch receives one of spectral components $270_1$–$270_N$ delivered to it from one of waveguides $206_1$–$206_N$. If the switch is in a transmissive state, the one spectral component crosses the switch and is coupled into first output $S2_i^{OUT1}$ for delivery to WGR 250 along appropriate waveguide $208_1$–$208_N$.

For example, in the exemplary embodiment of WSADM 1b shown in FIG. 5, switch $S2_1$ is in a transmissive state. Spectral component $270_1$ delivered to input $S2_1^{IN1}$ of switch $S2_1$ via waveguide $206_1$ crosses the switch, couples to output $S2_1^{OUT1}$ and is launched into waveguide $208_1$. Thus, spectral components, such as component $270_1$, entering switches that are in a transmissive state, traverse such switches undisturbed and are launched into waveguides, such as waveguide $208_1$, leading to a second (1×N) WGR 250. Spectral components entering the WGR 250 are recombined or remultiplexed therein. Remultiplexed signal 272 appears at the output of WGR 250 and is launched into waveguide 209 for transmission to a network node or the like.

If the switch is in a reflective state, the one spectral component received at input $S2_i^{IN1}$ is coupled into second output $S2_i^{OUT2}$ and launched into waveguide $210_i$ for drop. For example, in the exemplary embodiment of a WSADM 1b shown in FIG. 5, switch $S2_2$ is in a reflective state. Spectral component $270_2$ delivered to $S2_2^{IN1}$ of the switch $S2_2$ via waveguide $206_2$ encounters optical director 106. Upon contact with optical director 106, spectral component $270_2$ is reflected towards, and coupled with high efficiency into, second output $S2_2^{OUT2}$ and launched into waveguide $210_2$ for drop.

For switches that are in a reflective state, second input $S2_i^{IN2}$ can be used for adding a spectral component to the WDM signal. The added spectral component is delivered to $S2_i^{IN2}$ via "add" waveguide $212_i$, is then coupled into first output $S2_i^{OUT1}$ and launched into waveguide $208_i$.

For example, in switch $S2_2$, spectral component $270_{N+1}$ is added by delivering it to add waveguide $212_2$. As spectral component $270_{N+1}$ encounters optical director 106, it is reflected towards, and couples with high efficiency into, waveguide $208_2$. The spectral component is delivered to second WGR 250 and is multiplexed, along with spectral components $270_1$ and $270_3$–$270_N$, into WDM signal 272.

Figure 6:
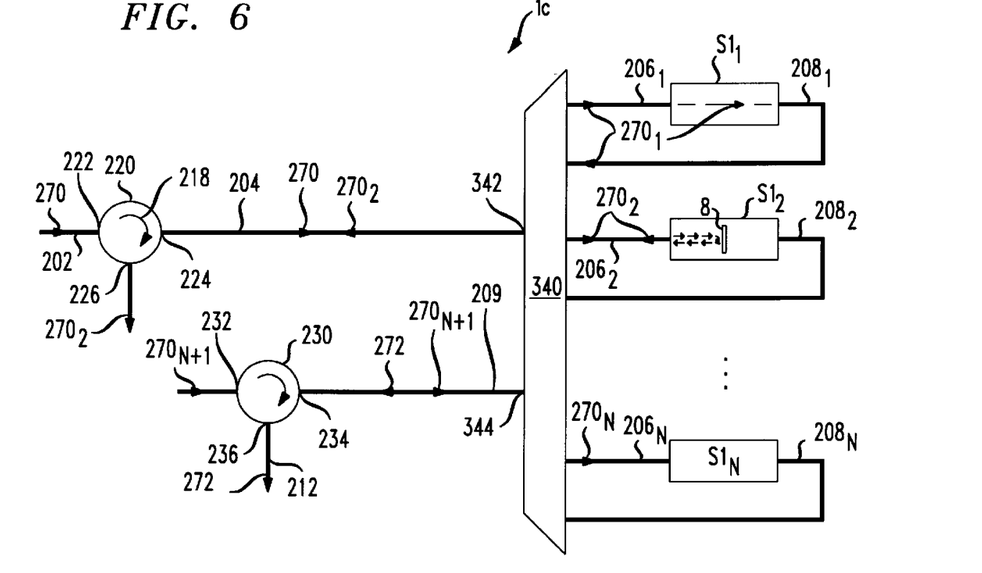
FIG. 6 shows a third illustrative embodiment of a wavelength-selective add-drop multiplexer comprising N (1×1) switches, two optical circulators and one (2×2N) demultiplexer/multiplexer.
Figure 7:
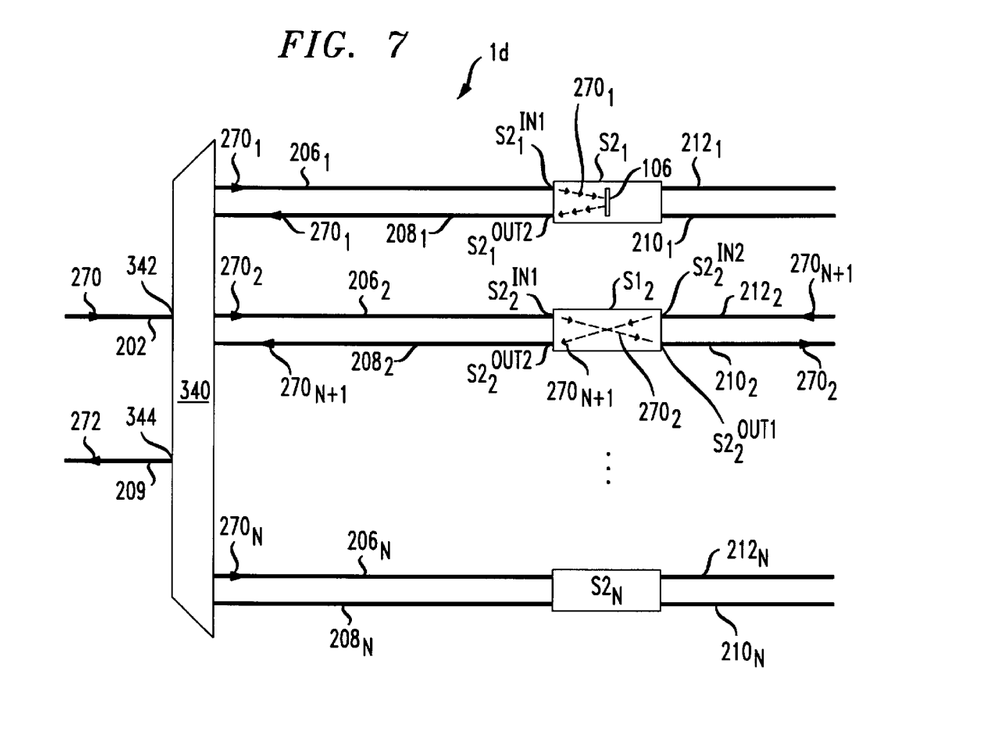
FIG. 7 shows a fourth illustrative embodiment of a wavelength-selective add-drop multiplexer comprising N (2×2) switches and one (2×2N) demultiplexer/multiplexer.

Third and fourth illustrative embodiments of a WSADM are shown in FIGS. 6 and 7. WSADM 1c and 1d shown in respective FIGS. 6 and 7 are configured such that only a single multiplexing/demultiplexing device 340 is required. Demultiplexer/multiplexer 340 is a (1×2N) device having ½ free spectral range. There are two ports 342, 344 on the "multiplexed" side of the device. In WSADM 1c shown in FIG. 6, as in the previously illustrated embodiments, the multiplexer/demultiplexer is realized as a WGR. One port 342 of WGR 340 receives the WDM signal 270 from waveguide 204, and further receives any spectral components selected for drop that are leaving WGR 340, such as spectral component $270_2$. The other port 344 receives remultiplexed signal 272 leaving WGR 340, and further receives any spectral components selected for add from waveguide 209, such as spectral component $270_{N+1}$.

WSADM 1c utilizes N (1×1) switches $S1_1$–$S1_N$ and two (1×N) optical circulators 220, 230. WSADM 1c receives, as input, WDM signal 270 carried on waveguide 202. As in WSADM 1a, WDM signal 270 is delivered to port 222 of optical circulator 220. WDM signal 270 is delivered to the next port along circulation direction 218, which is port 224. From port 224, signal 270 is launched along waveguide 204 towards (2×2N) WGR 340. Demultiplexed spectral components $270_1$–$270_N$ appear on the outputs of WGR 340 and are carried by waveguides $206_1$–$206_N$ to (N) (1×1) switches $S1_1$–$S1_N$.

As in the previously described embodiments, the ultimate disposition of a spectral component, i.e., drop or remultiplex into a WDM signal, is dictated by the state of the switch. For example, (1×1) switch $S1_2$ is shown in a substantially reflective state that causes spectral component $270_2$ to be reflected back along waveguide $206_2$ to WGR 340. Spectral component $270_2$ passes through WGR 340 and emerges on waveguide 204, which delivers that spectral component to port 224 of optical circulator 220. Optical circulator 220 advances the spectral component to port 226 for drop.

Switch $S1_1$ is shown in a transmissive state, wherein spectral component $270_1$ crosses switch $S1_1$ undisturbed and is launched into waveguide $208_1$. Spectral component $270_1$ and other spectral components crossing other switches $S1_3$–$S1_N$ are delivered to port 344 of WGR 340. Such components are remultiplexed into WDM signal 272 by WGR 340. WDM signal 272 is launched into waveguide 209 and delivered to port 234 of a second optical circulator 230. Optical circulator 230 delivers WDM signal 272 to port 236 and into waveguide 212 for transmission to a network node or the like.

One or more spectral components can be added using WSADM 1c by delivering such spectral components to port 232 of optical circulator 230. Again, for clarity of description, the addition of only one spectral component $270_{N+1}$ is described below. The one additional spectral component $270_{N+1}$ is advanced from port 232 to port 234 and launched into waveguide 209 towards port 344 of WGR 340. The WGR 340 delivers the spectral component onto the appropriate one of waveguides $208_1$–$208_N$ as a function of wavelength. Spectral component $270_N$ is assumed to have a wavelength appropriate for it to occupy the channel vacated by dropped spectral component $270_2$. As such, spectral component $270_{N+1}$ is launched into waveguide $208_2$ and encounters switch $S1_2$.

Recall that the switch $S1_2$ is in a substantially reflective state to effect the above-described "drop" of spectral component $270_2$. As such, spectral component $270_{N+1}$ is likewise reflected upon entering switch $S1_2$, but along waveguide $208_2$, so that upon entering WGR 340, it is multiplexed along with other spectral components $270_1$ and $270_3$–$270_N$ into WDM signal 272 and delivered to port 344. From port 344, WDM signal 272 is launched into waveguide 209 and is received by port 234 of optical circulator 230. The optical circulator delivers signal 272 to port 236, at which point signal 272 is launched into waveguide 212 for transmission to a network node or the like.

FIG. 7 shows a fourth illustrative embodiment of a WSADM 1d. In WSADM 1d, as in WSADM 1b, a multiplicity of (N) (2×2) switches $S2_1$–$S2_N$ replace the (1×1) switches. As before, using the (2×2) switches $S2_1$–$S2_N$, optical circulators 220, 230 that were required for use in conjunction with the (1×1) switches are no longer needed.

WSADM 1d receives, as input, WDM signal 270 carried on waveguide 202. WDM signal 270 is delivered to port 342 of (2×2N) WGR 340. The WGR 340 demultiplexes WDM signal 270. Demultiplexed spectral components $270_1$–$270_N$ appear on the outputs of WGR 340 and are carried by waveguides $206_1$–$206_N$ to (2×2) switches $S2_1$–$S2_N$.

In the illustrative embodiment of a WSADM 1d shown in FIG. 7, and unlike the previously-described embodiments, placing a switch, such as switch $S2_2$, in a substantially transmissive state causes spectral component drop and add. For example, after being delivered, via waveguide $206_2$, to first input $S2_2^{IN1}$ of switch $S2_2$, spectral component $270_2$ is coupled to first output $S2_2^{OUT1}$ and launched into waveguide $210_2$ for drop. Spectral component $270_{N+1}$ is added by delivering it the second input $S2_2^{IN2}$ via waveguide $212_2$. Spectral component $270_{N+1}$ is coupled to second output $S2_2^{OUT2}$, launched into waveguide $208_2$ and delivered thereby to WGR 340. Spectral component $270_{N+1}$ is multiplexed, along with spectral components that have not been dropped, into WDM signal 272, delivered to port 344 and launched into waveguide 209 for transmission to a network node or the like.

Spectral components, such as spectral component $206_1$ that are delivered to first input $S2_i^{IN1}$ of switches that are in a reflective state, such as switch $S2_1$, are coupled to output $S2_i^{OUT2}$ on contact with optical director 106. Such spectral components are then delivered, via waveguide $208_i$, to WGR 340. Those spectral components are multiplexed in WGR 340 into WDM signal 272 and delivered to output 344. WDM signal 272 is launched into waveguide 209 for transmission to a network node or the like.

Figure 9:
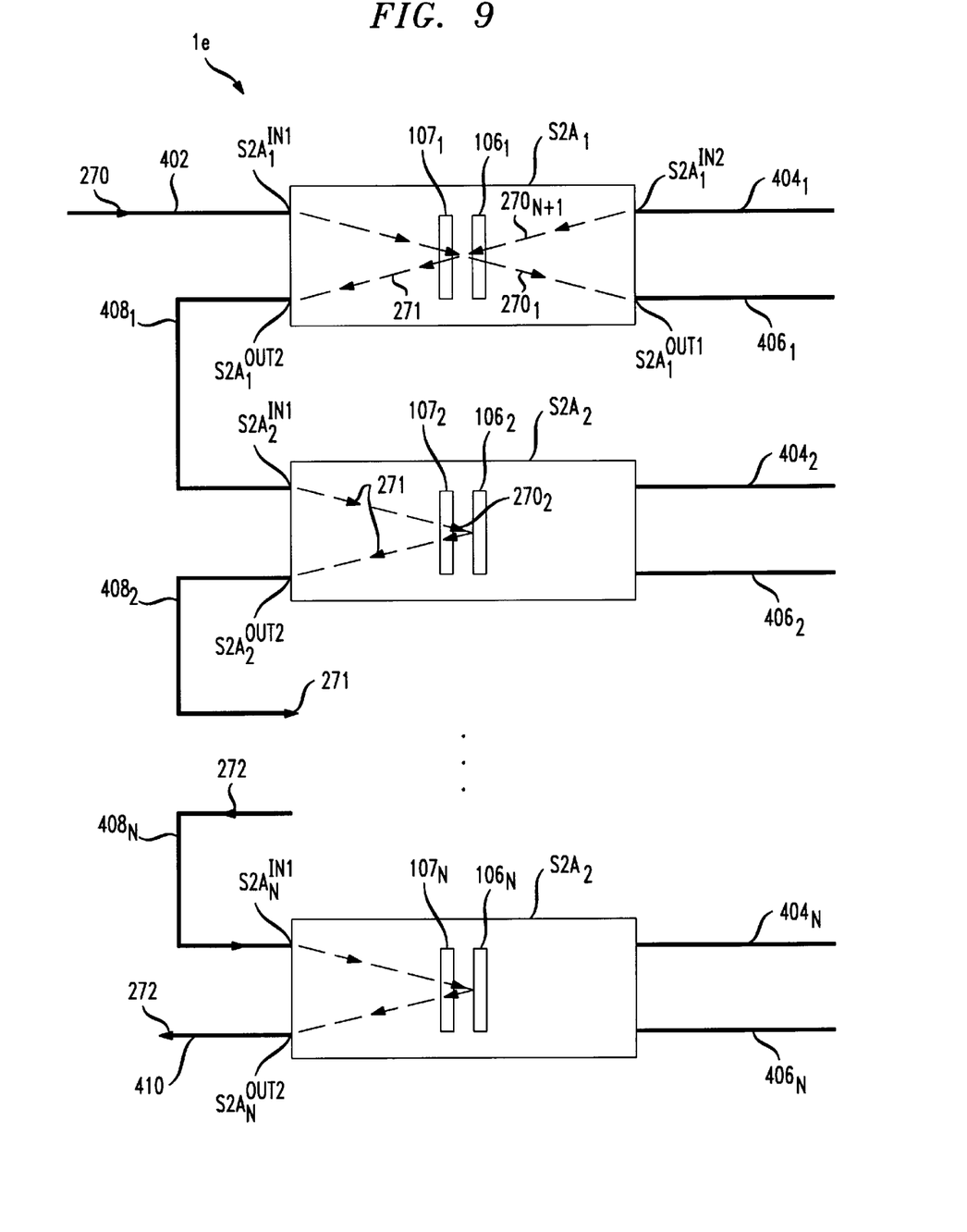
FIG. 9 shows a fifth illustrative embodiment of a wavelength-selective add-drop multiplexer comprising a cascade of fiber-linked N (2×2) switches that are configured in the manner of the switch shove in FIGS. 8a & 8b.
Figure 10:
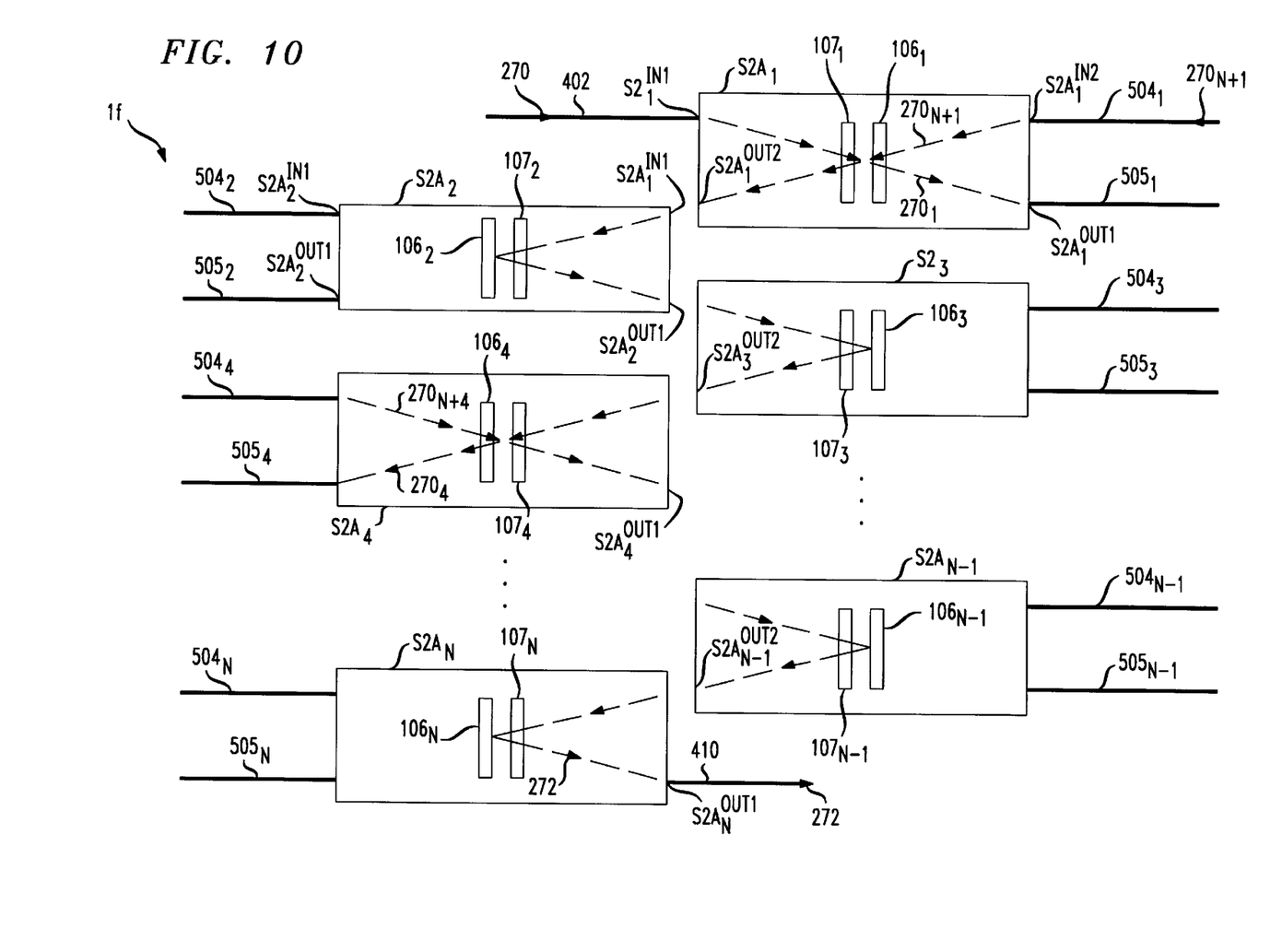
FIG. 10 shows a sixth illustrative embodiment of a wavelength-selective add-drop multiplexer comprising a cascade of N (2×2) switches communicating in free space and configured in the manner of the switch shown in FIGS. 8a & 8b.

FIGS. 9 and 10 show two additional exemplary embodiments of a WSADM. In those embodiments, the demultiplexing/multiplexing device that was used in the previously-described embodiments, e.g., the WGR, is not required. Rather, a plurality of wavelength "filtering" devices, such as may be realized, for example, by thin film transmission filters or fiber Bragg gratings, are used for adding and dropping spectral components from a WDM signal, as required.

Before describing the WSADMs shown in FIGS. 9 and 10, the functioning of the wavelength filtering device is described below in conjunction with the illustrations of FIGS. 8a and 8b. Those Figures show a (2×2) switch, similar to the (2×2) switch previously described, but further including wavelength filtering device 107. In one embodiment, wavelength filtering device 107 is a dielectric surface coating disposed on an end of a lens. As previously described, in some embodiments of the (2×2) switches utilized in conjunction with the present invention, two grin lenses are used to create telecentric imaging device 104 (FIGS. 3A & 3B). Thus, a dielectric surface coating can be disposed on an end of one of such grin lenses. The dielectric surface coating, which comprises a plurality of dielectric layers having different indices of refraction, is operable to reflect a preselected group of spectral components, and to transmit other spectral components. Forming such a surface coating to reflect a given group of spectral components, and to transmit others, is within the capabilities of those skilled in the art.

Figure 8A:
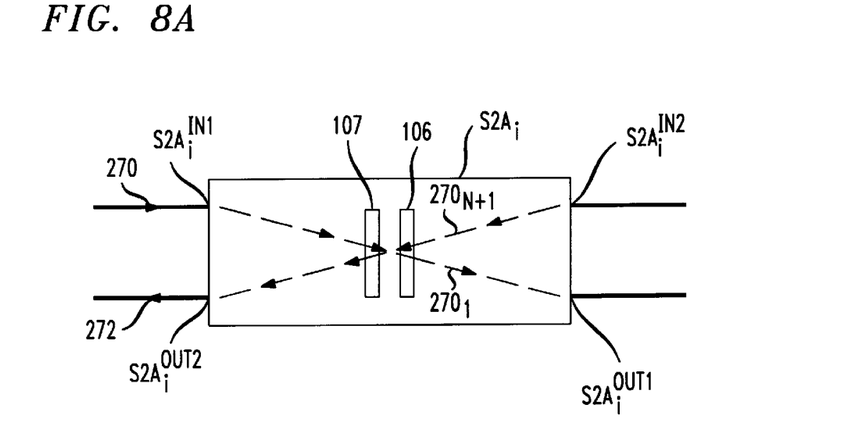
FIG. 8a shows a second embodiment of a (2×2) switch incorporating a wavelength filtering device, wherein the switch is in a transmissive state.

Referring now to FIG. 8a, WDM signal 270 is received at input $S2A_i^{IN1}$ and directed toward wavelength filtering device 107. In the present illustrative embodiment, wavelength filtering device 107 is operable, by design, to reflect spectral components $270_2$–$270_N$. Thus, upon contact with the wavelength filtering device 107, those spectral components are reflected toward the output $S2A_i^{OUT2}$, while spectral component $270_1$ is transmitted through the wavelength filtering device. In FIG. 8a, switch $S2A_i$ is in a transmissive state, so that spectral component $270_1$ is transmitted through optical director 106 and is coupled into output $S2A_i^{OUT1}$ for drop. Additionally, in the embodiment shown in FIG. 8a, spectral component $270_{N+1}$ is added to the retained group of spectral components, forming WDM signal 272. Spectral components $270_1$ and $270_{N+1}$ have substantially similar wavelengths, so that spectral component $270_{N+1}$ will not be reflected upon contact with wavelength filtering device 107, but rather pass through it as did spectral component $270_1$.

Figure 8B:
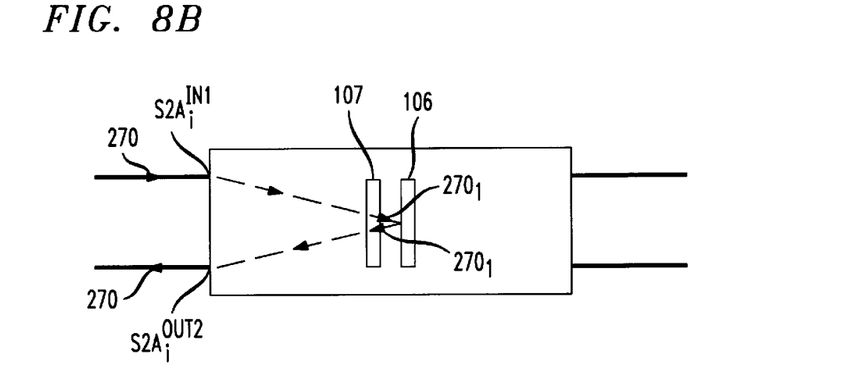
FIG. 8b shows the embodiment of a (2×2) switch of FIG. 8a, wherein the switch is in a reflective state.

In FIG. 8b, switch $S2A_i$ is shown in a reflective state, so that after passing through wavelength filtering device 107, spectral component $270_1$ is reflected by optical director 106, passes again through wavelength filtering device 107, and rejoins spectral components $270_2$–$270_N$. Thus, although wavelength filtering device 107 always reflects spectral components having particular wavelengths, and transmits spectral components having other wavelengths, the "drop" of spectral components having the other wavelengths is controllable as a function of the state of the switch.

Figure 8C:
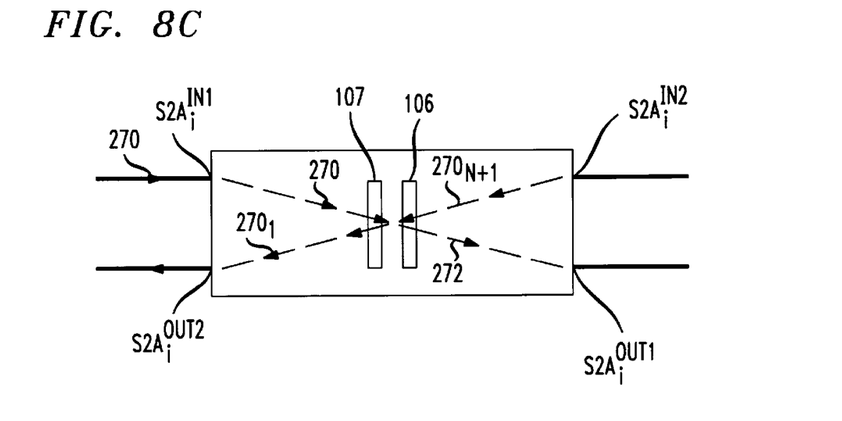
FIG. 8c shows a third embodiment of a (2×2) switch, wherein the wavelength selective filtering device transmits a greater portion of spectral components and reflects a lesser portion of spectral components.

In the embodiment shown in FIGS. 8a & 8b, wavelength filtering device 107 reflects a major portion of spectral components, i.e., $270_2$–$270_N$, of WDM signal 270, transmitting just one spectral component $270_1$. FIG. 8c shows an alternate embodiment, wherein wavelength filtering device 107 is operable to reflect a single spectral component, e.g., $270_1$, toward $S2A_i^{OUT2}$, and transmit the balance of the spectral components $270_2$–$270_N$ to output $S2A_i^{OUT1}$. Spectral component $270_{N+1}$ is added by delivering it to input $S2A_i^{IN2}$, from where it is directed towards, and passes through, optical director 106. Spectral component $270_{N+1}$ encounters wavelength filtering device 107, and is reflected thereby towards output $S2A_i^{OUT1}$. Note that in the embodiment pictured in FIG. 8c, the switch is maintained in a transmissive state, and the filtered spectral component is always dropped.

Referring now to FIG. 9, in an exemplary embodiment, WSADM 1e comprises a cascade of N waveguide-coupled (2×2) switches $S2A_1$–$S2A_N$. In the illustrative embodiment of the WSADM 1e of FIG. 9, the (2×2) switches are configured as shown in FIGS. 8a & 8b. It should be understood that in other embodiments, the switches can be configured as shown in FIG. 8c. WDM signal 270 is delivered to input $S2A_1^{IN1}$ of switch $S2A_1$ via waveguide 402.

WDM signal 270 is directed toward wavelength filtering device $107_1$, and, upon contact with that wavelength filtering device, spectral components $270_2$–$270_N$ of WDM signal 270 are reflected towards output $S2A_1^{OUT2}$. Spectral component $270_1$ is transmitted through wavelength filtering device $107_1$, and, since switch $S2A_1$ is in a transmissive state, further passes through optical director $106_1$ and is coupled to output $S2A_1^{OUT1}$. Spectral component $270_{N+1}$ is delivered to input $S2A_1^{IN1}$ for add via waveguide $404_1$. Spectral component $270_{N+1}$ is coupled to output $S2A_1^{OUT2}$, passing through optical director $106_1$ and wavelength filtering device $107_1$.

WDM signal 271, comprising spectral components coupled to output $S2A_1^{OUT2}$, is launched into waveguide $408_1$ and delivered to input $S2A_2^{IN1}$ of switch $S2A_2$. Since switch $S2A_2$ is in a reflective state, all spectral components are reflected towards output $S2A_2^{OUT2}$, including spectral component $270_2$, which passes through wavelength filtering device $107_2$.

The WDM signal passes through a sequence of switches $S2A_3$–$S2A_{N-1}$, wherein spectral components may be dropped and added via operation of wavelength filtering devices $107_3$–$107_{N-1}$. Finally, waveguide $408_N$ delivers WDM signal 272 to input $S2A_N^{IN1}$ of switch $S2A_N$. In the example shown in FIG. 9, all spectral components of the WDM signal 272 are reflected towards output $S2A_2^{OUT2}$, and launched into waveguide 410.

FIG. 10 shows an exemplary embodiment of a WSADM 1f comprising a cascade of N (2×2) switches $S2A_1$–$S2A_N$.

Rather using waveguides for signal transmission between switches as in the embodiment shown in FIG. 9, the WDM signals are passed between adjacent switches in "free space." In the illustrative embodiment of WSADM 1f of FIG. 10, the (2×2) switches are again configured as shown in FIGS. 8a & 8b. It should be understood that in other embodiments, the switches can be configured as shown in FIG. 8c.

WDM signal 270 is delivered to input $S2A_1^{IN1}$ of switch $S2A_1$ via waveguide 402. Wavelength filtering devices $107_1$, $107_3$, ... $107_{N-1}$ in odd-numbered switches reflect preselected spectral components toward respective outputs $S2A_1^{OUT2}$, $S2A_3^{OUT2}$, ... $S2A_{N-1}^{OUT2}$ and wavelength filtering devices $107_2$, $107_4$, ... $107_N$ in even-numbered switches reflect preselected spectral components toward respective outputs $S2A_2^{OUT1}$, $S2A_4^{OUT1}$, ... $S2A_N^{OUT1}$. Spectral components can be dropped, such as the spectral components $270_1$ and $270_4$ in respective switches $S2A_1$ and $S2A_4$. To do so, those switches are placed in a transmissive state so that those spectral components pass through respective optical directors $106_1$ and $106_4$. And, spectral components can be added, such as spectral components $270_{N+1}$ and $270_{N+4}$ in respective switches $S2A_1$ and $S2A_4$. In that manner, the WDM signal is cascaded through the plurality of N switches, dropping and adding spectral components as required, until WDM signal 272 emerges onto waveguide 410 for transmission to a network node or the like.

The present WSADM may be advantageously incorporated into a optical communications network to vary information content carried by a WDM signal to the various nodes in the network.

Although specific embodiments of this invention have been described herein, it is to be understood that these embodiments arc merely illustrative of the principles of this invention. Numerous and varied modifications may occur to, and be implemented by, those of ordinary skill in the art in view of the present teachings without departing from the scope and the spirit of the invention.

We claim:

1. An article operable to drop a spectral component from a first wavelength division multiplexed (WDM) signal having a plurality of spectral components, each spectral component having a different wavelength, comprising:
   a spectral component separator having:
      a first port on a first side thereof, wherein the first WDM signal is received at said first port and demultiplexed in the spectral component separator into the plurality of spectral components;
      a second port at the first side thereof;
      a set of third ports at a second side thereof, wherein said plurality of spectral components are delivered to said third ports;
      a set of fourth ports at the second side thereof, wherein spectral components that are received at said fourth ports are multiplexed into a second WDM signal in the spectral component separator and delivered to said second port; and
   a plurality of optical switches in optical communication with the spectral component separator, each of said optical switches having:
      a first input in optical communication with one of said third ports; and
      a first output in optical communication with one of said fourth ports, wherein,
         in a first state, a spectral component received at said first input from said one third port is delivered to said first output, and
         in a second state, a spectral component received at said first input from said one third port is not delivered to said first output and is routed to a dropping device where it is dropped.

2. The article of claim 1 further comprising means for adding a spectral component to said second WDM signal.

3. The article of claim 2, wherein said optical switches are 1×1 switches.

4. The article of claim 3, wherein:
   when said optical switches are in the second state, said spectral component received at said first input of said optical switches is returned to the third port of the spectral component separator that optically communicates therewith; and
   said third ports are operable to deliver a returned spectral component to said first port at said first side of said spectral component separator;
   the article of claim 3 further comprising:
      a first optical circulator having first, second and third ports, wherein:
         an optical signal received at the first port is advanced to the second port, and an optical signal received at the second port is advanced to the third port;
         said first port receives the first WDM signal;
         said second port is in optical communication with said first port of said spectral component separator;
         said third port is in optical communication with a drop line, wherein the third port and said drop line comprise said dropping device; and
      a second optical circulator having fourth, fifth and six ports, wherein:
         an optical signal received at the fourth port is advanced to the fifth port, and an optical signal that is received at the fifth port is advanced to the six port;
         said fourth port receives the spectral component to be added to the second WDM signal;
         said six port is in optical communication with an output line;
         said fifth port is in optical communication with said second port of said spectral component separator.

5. The article of claim 2, wherein said optical switches are 2×2 switches, said 2×2 switches further comprising a second output and a second input.

6. The article of claim 5, wherein:
   said optical switches are operable, in the second state, to route said spectral component received at said first input to said second output;
   said second output is in optical communication with a drop line, said second output and said drop line comprising said dropping device;
   said second input is in optical communication with an add line; and
   said optical switches are operable, in the second state, to receive said spectral component to be added at said second input and to route it to said first output, said second input and said add line comprising said means for adding a spectral component.

7. The article of claim 1, wherein said optical switches have a micro-electromechanical actuator linked to a constant-reflectivity device.

8. An article operable to drop a spectral component from a first wavelength division multiplexed (WDM) signal having a first plurality of spectral components, each spectral component having a different wavelength, comprising:

a spectral component separator having:
  a first port at a first side thereof, wherein the first WDM signal is received at said first port and demultiplexed in the spectral component separator into the first plurality of spectral components;
  a set of second ports at a second side thereof, wherein said plurality of spectral components are routed to said second ports;
a spectral component combiner having:
  a set of third ports at a first side thereof, wherein a second plurality of spectral components received at the third ports are multiplexed in the spectral component combiner defining a second WDM signal;
  a fourth port at a second side thereof, wherein said second WDM signal is routed to said fourth port;
a plurality of optical switches, each having:
  a first input in optical communication with one of said second ports;
  a first output in optical communication with a drop line, wherein said first output and said drop line comprise said dropping device;
  a second input in optical communication with an add line, wherein said second input and said add line comprise said means for adding a spectral component; and
  a second output in optical communication with one of said third ports; wherein
    in a first state, one of said first plurality of spectral components is received at said first input and is delivered to said second output, and
    in a second state, a spectral component to be added is received at said second input and is delivered to said second output, and one of said first plurality of spectral components is received at said first input and is delivered to said first output.

9. The article of claim 8, wherein said optical switches have a micro-electromechanical actuator linked to a constant-reflectivity device.

10. The article of claim 8, wherein said optical switches comprise a variable-reflectivity device.

11. An article operable to drop a spectral component from a first wavelength division multiplexed (WDM) signal having a first plurality of spectral components, each spectral component having a different wavelength, said article having:

a plurality of 2×2 optical switches optically coupled in series, each 2×2 switch having:
  a first input and a second input;
  a first output and a second output; wherein:
    one of said first or second outputs of a first one of said optical switches is in optical communication with one of said first and second inputs of an adjacent 2×2 optical switch;
  an optical director operable to direct a spectral component to either one of the first or second outputs, wherein:
    in a first state, the optical director is invisible to a spectral component; and
    in a second state, the optical director reflects a spectral component incident thereon, wherein,
      in the second state, the optical director is disposed between said first input and said first output, and between said first output and said second output; and
  a spectral component separator comprising a wavelength selective filter operable to transmit a selected spectral component and further operable to reflect other spectral components, wherein:
    said wavelength selective filter is disposed between said first input and said first output, and between said first output and said second output; and
    said spectral components are incident on said wavelength selective filter before said optical director.

12. The article of claim 11 wherein the selected spectral component transmitted through said wavelength selective filter is directed to said first output, wherein said first output is optically coupled to a drop line.

13. The article of claim 12 wherein said second input is optically coupled to an add line.

14. The article of claim 13 wherein said wavelength selective filter is a dielectric surface coating disposed on an end of a grins lens.

15. The article of claim 13 further comprising a waveguide that couples said first 2×2 optical switch to said adjacent 2×2 optical switch.

16. The article of claim 13 wherein said first 2×2 optical switch is free-space coupled to said adjacent 2×2 optical switch.

* * * * *